(12) United States Patent
Nakamura (10) Patent No.: US 9,031,305 B2
(45) Date of Patent: May 12, 2015

(54) IMAGE CLASSIFICATION APPARATUS WITH FIRST AND SECOND FEATURE EXTRACTION UNITS AND RECORDING MEDIUM HAVING PROGRAM RECORDED THEREIN

(71) Applicant: Panasonic Healthcare Holdings Co., Ltd., Minato-Ku, Tokyo (JP)

(72) Inventor: Akira Nakamura, Hirakata (JP)

(73) Assignee: Panasonic Healthcare Holdings Co., Ltd. (JP)

( * ) Notice: Subject to any disclaimer, the term of this patent is extended or adjusted under 35 U.S.C. 154(b) by 179 days.

(21) Appl. No.: 13/754,026

(22) Filed: Jan. 30, 2013

(65) Prior Publication Data

US 2013/0236081 A1  Sep. 12, 2013

Related U.S. Application Data

(63) Continuation of application No. PCT/JP2011/079762, filed on Dec. 22, 2011.

(30) Foreign Application Priority Data

Feb. 17, 2011 (JP) ................. 2011-032492

(51) Int. Cl.
*G06K 9/00* (2006.01)
*G06T 7/00* (2006.01)
*G06K 9/46* (2006.01)
*G06K 9/62* (2006.01)

(52) U.S. Cl.
CPC .......... *G06K 9/00147* (2013.01); *G06T 7/0081* (2013.01); *G06T 2207/20141* (2013.01); *G06K 9/4642* (2013.01); *G06K 9/6221* (2013.01); *G06K 9/6278* (2013.01)

(58) Field of Classification Search
None
See application file for complete search history.

(56) References Cited

U.S. PATENT DOCUMENTS

| 5,781,899 | A | 7/1998 | Hirata | |
|---|---|---|---|---|
| 6,913,877 | B1 * | 7/2005 | Chaplen et al. | 435/4 |
| 7,711,174 | B2 * | 5/2010 | Sammak et al. | 382/133 |
| 8,041,090 | B2 * | 10/2011 | Alexandrov et al. | 382/128 |
| 8,320,655 | B2 * | 11/2012 | Sarachan et al. | 382/133 |
| 2002/0159642 | A1 * | 10/2002 | Whitney | 382/225 |
| 2002/0164070 | A1 * | 11/2002 | Kuhner et al. | 382/159 |
| 2006/0063156 | A1 * | 3/2006 | Willman et al. | 435/6 |
| 2006/0120627 | A1 | 6/2006 | Shiiyama | |
| 2007/0025606 | A1 * | 2/2007 | Gholap et al. | 382/128 |
| 2008/0082468 | A1 * | 4/2008 | Long et al. | 706/12 |
| 2008/0292154 | A1 * | 11/2008 | Nishimura et al. | 382/128 |
| 2009/0087074 | A1 * | 4/2009 | Wong et al. | 382/133 |
| 2010/0231802 | A1 * | 9/2010 | Han et al. | 348/699 |

FOREIGN PATENT DOCUMENTS

| JP | 2006250975 A | 9/2006 |
|---|---|---|
| WO | 2012111236 A1 | 8/2012 |

* cited by examiner

*Primary Examiner* — Matthew Bella
*Assistant Examiner* — Jason Heidemann
(74) *Attorney, Agent, or Firm* — Cantor Colburn LLP (57) ABSTRACT

An image-classification apparatus includes: a first feature extraction unit to acquire a feature value of each of block images obtained by segmenting an input image; an area-segmentation unit to assign each of the block images to any one of K areas based on the feature value; a second feature extraction unit to acquire, based on an area-segmentation result, a feature vector whose elements including, the number of adjacent spots, each including two block images adjacent to each other in the input image, for each combination of the areas whereto the two block images are assigned; or a ratio of the number of block images assigned to each of the K areas to all the number of block images adjacent to a block image assigned to each of the K areas; and a classification unit to classify to which of a plurality of categories the input image belongs.

9 Claims, 10 Drawing Sheets

| S5: CALCULATE FEATURE VECTOR v2[I] BASED ON AREA SEGMENTATION RESULT Seg[I] (METHOD 1) | | | |
|---|---|---|---|
| INPUT IMAGE I | FEATURE VECTOR v2[I] | | |
| | THE NUMBER OF BLOCK IMAGES $n_i$ ASSIGNED TO AREA $c_i$ | | |
| | $n_0$ | $n_1$ | $n_2$ |
| I1 | 5 | 22 | 53 |
| I2 | 4 | 22 | 54 |

| INPUT IMAGE I | FEATURE VECTOR v2[I] | | | | | | | | |
|---|---|---|---|---|---|---|---|---|---|
| | THE NUMBER OF BLOCK IMAGES $n_i$ ASSIGNED TO AREA $c_i$ | | | THE NUMBER OF ADJACENT SPOTS $N_{ij}$ EACH INCLUDING BLOCK IMAGE ASSIGNED TO AREA $c_i$ AND BLOCK IMAGE ASSIGNED TO AREA $c_j$ | | | | | |
| | $n_0$ | $n_1$ | $n_2$ | $n_{00}$ | $n_{01}$ | $n_{02}$ | $n_{11}$ | $n_{12}$ | $n_{22}$ |
| I1 | 5 | 22 | 53 | 8 | 24 | 0 | 47 | 49 | 140 |
| I2 | 4 | 22 | 54 | 5 | 16 | 0 | 52 | 33 | 162 |
| I3 | 5 | 22 | 53 | 1 | 0 | 32 | 62 | 40 | 133 |

S5: CALCULATE FEATURE VECTOR v2[I] BASED ON AREA SEGMENTATION RESULT Seg[I] (METHOD 2)

FIG. 12

| S5: CALCULATE FEATURE VECTOR v2[] BASED ON AREA SEGMENTATION RESULT Seg[] (METHOD 3) | | | | | | | | | | |
|---|---|---|---|---|---|---|---|---|---|---|
| INPUT IMAGE I | FEATURE VECTOR v2[] | | | | | | | | | |
| | PROBABILITY $p(c_i)$ THAT BLOCK IMAGES WILL BE ASSIGNED TO AREA $c_i$ | | | PROBABILITY $p(c_j\|c_i)$ THAT BLOCK IMAGE ASSIGNED TO AREA $c_i$ WILL BE ADJACENT TO BLOCK IMAGE ASSIGNED TO AREA $c_j$ | | | | | | |
| | $p(c_0)$ = $n_0/M{\times}N$ | $p(c_1)$ = $n_1/M{\times}N$ | $p(c_2)$ = $n_2/M{\times}N$ | $p(c_0\|c_0)$ = $2n_{00}/N_0$ | $p(c_1\|c_0)$ = $n_{01}/N_0$ | $p(c_2\|c_0)$ = $n_{02}/N_0$ ($N_0 = 2n_{00}+n_{01}+n_{02}$) | $p(c_0\|c_1)$ = $n_{10}/N_1$ | $p(c_1\|c_1)$ = $2n_{11}/N_1$ | $p(c_2\|c_1)$ = $n_{12}/N_1$ ($N_1 = n_{10}+2n_{11}+n_{12}$) | $p(c_0\|c_2)$ = $n_{20}/N_2$ | $p(c_1\|c_2)$ = $n_{21}/N_2$ | $p(c_2\|c_2)$ = $2n_{22}/N_2$ ($N_2 = n_{20}+n_{21}+2n_{22}$) |
| I1 | 0.063 | 0.275 | 0.663 | 0.400 | 0.600 | 0 | 0.144 | 0.563 | 0.293 | 0 | 0.149 | 0.851 |
| I2 | 0.050 | 0.275 | 0.675 | 0.385 | 0.615 | 0 | 0.105 | 0.680 | 0.216 | 0 | 0.092 | 0.908 |
| I3 | 0.063 | 0.275 | 0.663 | 0.059 | 0 | 0.941 | 0 | 0.756 | 0.244 | 0.095 | 0.118 | 0.787 |

FIG. 13

IMAGE CLASSIFICATION APPARATUS WITH FIRST AND SECOND FEATURE EXTRACTION UNITS AND RECORDING MEDIUM HAVING PROGRAM RECORDED THEREIN

CROSS-REFERENCE TO RELATED APPLICATION

This application is a continuation under 35 U.S.C. §120 of PCT/JP2011/079762, filed on Dec. 22, 2011, which is incorporated herein by reference, and which claims priority to Japanese Application No. 2011-032492, filed Feb. 17, 2011. The present application likewise claims priority under 35 U.S.C. §119 to Japanese Application No. 2011-032492, filed Feb. 17, 2011, the entire content of which is also incorporated herein by reference.

BACKGROUND OF THE INVENTION

1. Field of the Invention

The present invention relates to an image classification apparatus and a recording medium having a program recorded therein.

2. Description of the Related Art

Image classification techniques have been used in various fields in recent years. For example, a technique of classifying which category out of two or more pre-defined categories an input image belongs to is used in optical character recognition (OCR), a facial recognition system (FRS). In these techniques, a category to which an input image belongs is classified through a step of extracting an area of a target to be classified, such as a character and a face, from the input image, a step of extracting feature value from the extracted area, and a step of comparing the extracted feature value with a feature value of each category prepared in advance, for example.

Further, for example, Japanese Laid-Open Patent Publication Nos. 8-180176 and 2006-163841 disclose techniques of classifying an image not based on the similarity of a specific target included in the image but based on the similarity of the overall composition of the image or an impression the image conveys. An image accumulating/managing apparatus of Japanese Laid-Open Patent Publication No. 8-180176 assigns an area number to each of the blocks obtained by dividing an image in a lattice manner, and uses an image index describing the attribute for each area, thereby being able to retrieve an image with high similarity as a whole. An image retrieval apparatus of Japanese Laid-Open Patent Publication No. 2006-163841 calculates total similarity using feature values, such as an aspect ratio, size, and barycentric coordinates, of each of partial areas constituting a document image, thereby retrieving the document image.

As such, an image whose overall composition is similar can be retrieved by acquiring the similarity between images, reflecting the similarity in shape and position between the areas, using feature value of each of the areas.

However, in natural phenomena, such as cell masses (cell colony) cultured by a cell culture apparatus and generation/growth of clouds, the shapes, sizes, directions, and positions of such targeted to be classified as cell masses and clouds vary and/or are unfixed. Thus, images belonging to the same category may be different from each other to a large degree in their overall compositions. Further, there is another case where it is difficult to accurately extract an area of the target to be classified since the outline of the target to be classified is unclear or a part of the target to be classified extends off a field of view of an image.

Thus, with the above described image classification techniques, it is impossible to classify a category with respect to an input image of a natural phenomenon, such as cell masses and clouds.

SUMMARY OF THE INVENTION

An image classification apparatus according to an aspect of the present invention, includes: a first feature extraction unit configured to segment an input image into a plurality of block images each having a predetermined size, and acquire a feature value of each of the plurality of block images; an area segmentation unit configured to segment the input image into K areas by assigning each of the plurality of block images to any one of the K areas based on the feature value, K denoting an integer equal to or greater than two; a second feature extraction unit configured to acquire, based on an area segmentation result of the area segmentation unit, a feature vector whose elements including, the number of adjacent spots in each of areas, the adjacent spots is where two of the block images are adjacent to each other, the each of areas corresponding to an area to which the each of the two of the block images are assigned, or a probability that one of the block images, which is assigned to one of the K areas, is adjacent to another one of the block images, the another one of the block images is assigned to the same area as to which the one of the block images is assigned or is assigned to a different area from the area to which one of the block images is assigned; and a classification unit configured to classify which of a plurality of categories the input image belongs to, based on the feature vector.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.
=Configuration of Image Classification Apparatus=
Hereinafter, a description will be given of a configuration of an image classification apparatus according to one embodiment of the present invention, referring to FIG. 1.

Figure 1:
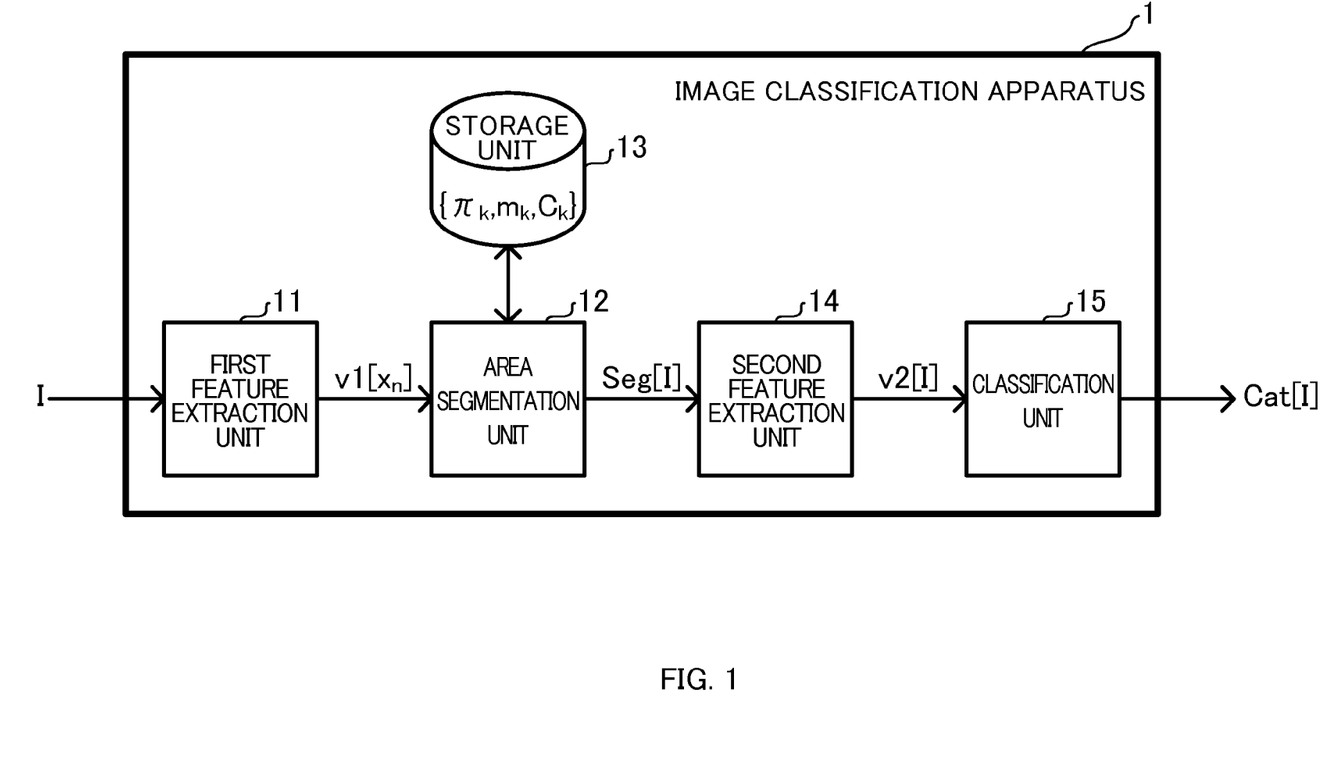
FIG. 1 is a block diagram illustrating a configuration of an image classification apparatus according to one embodiment of the present invention.

An image classification apparatus 1 illustrated in FIG. 1 includes: a first feature extraction unit 11; an area segmentation unit 12; a storage unit 13; a second feature extraction unit 14; and a classification unit 15.

An input image I is inputted to the first feature extraction unit 11, and a feature value $v1[x_n]$ outputted from the first feature extraction unit 11 is inputted to the area segmentation unit 12. The storage unit 13 is configured to store therein cluster attributes $\{\pi_k, m_k, C_k\}$ acquired from the clustering result of learning block image group IL, which will be described later. The cluster attributes are read by the area segmentation unit 12 as appropriate. Further, the area segmentation result Seg[I] of the input image I is inputted from the area segmentation unit 12 to the second feature extraction unit 14, and a feature vector v2[I] outputted from the second feature extraction unit 14 and is inputted to the classification unit 15. The classification unit 15 outputs a classification category Cat[I].
=Operation of Image Classification Apparatus=
Hereinafter, the operation of the image classification apparatus according to an embodiment of the present invention will be described, referring to FIGS. 2 to 9.

Figure 2:
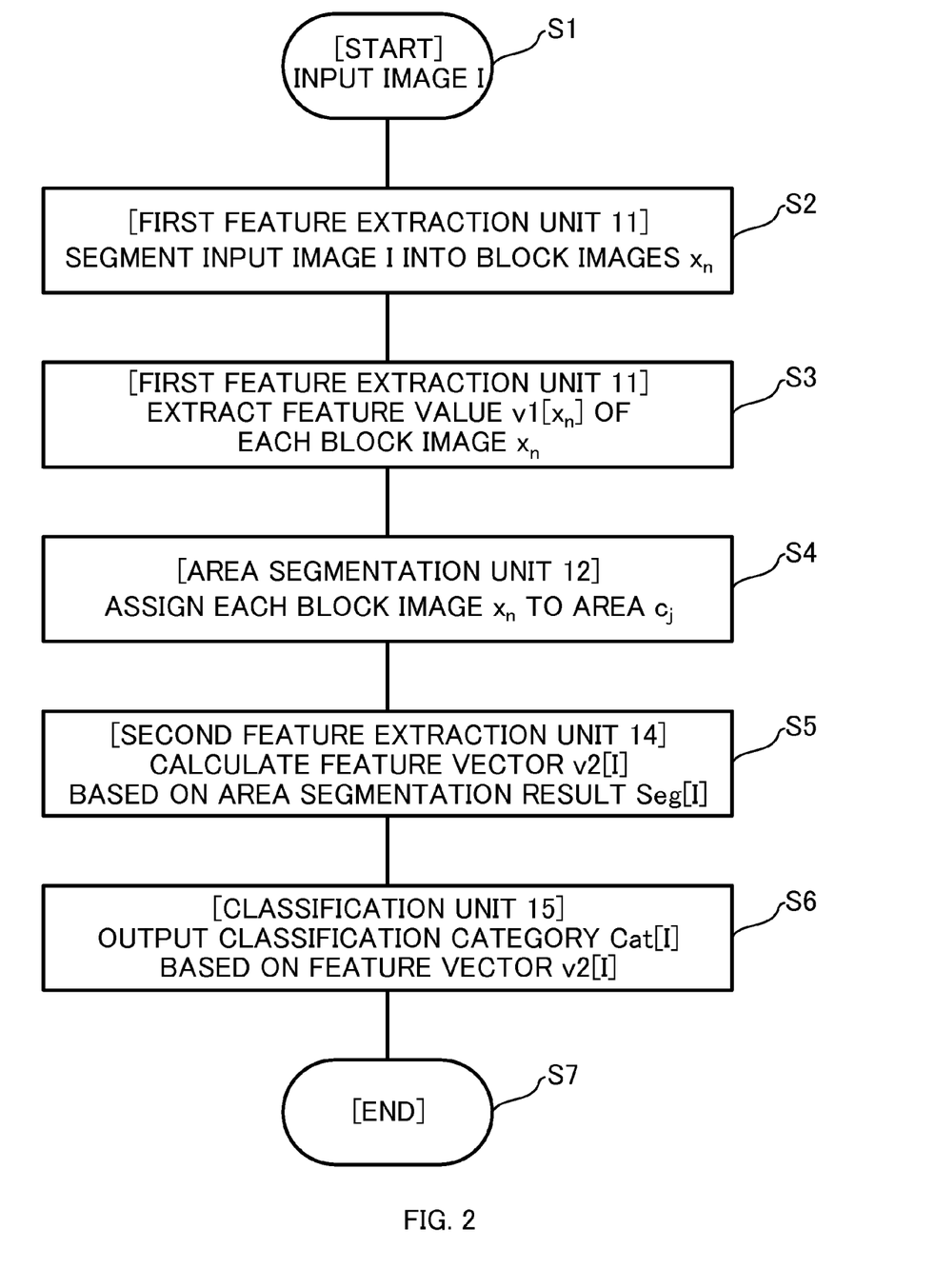
FIG. 2 is a flowchart for explaining an operation of an image classification apparatus according to one embodiment of the present invention.

The functions of the first feature extraction unit 11, the area segmentation unit 12, the second feature extraction unit 14, and the classification unit 15 in the image classification apparatus 1 are realized by a computer including the storage unit 13, for example. FIG. 2 depicts the operation of a program for causing the computer to realize functions equivalent to those of the first feature extraction unit 11, area segmentation unit 12, second feature extraction unit 14, and classification unit 15.

Figure 3:
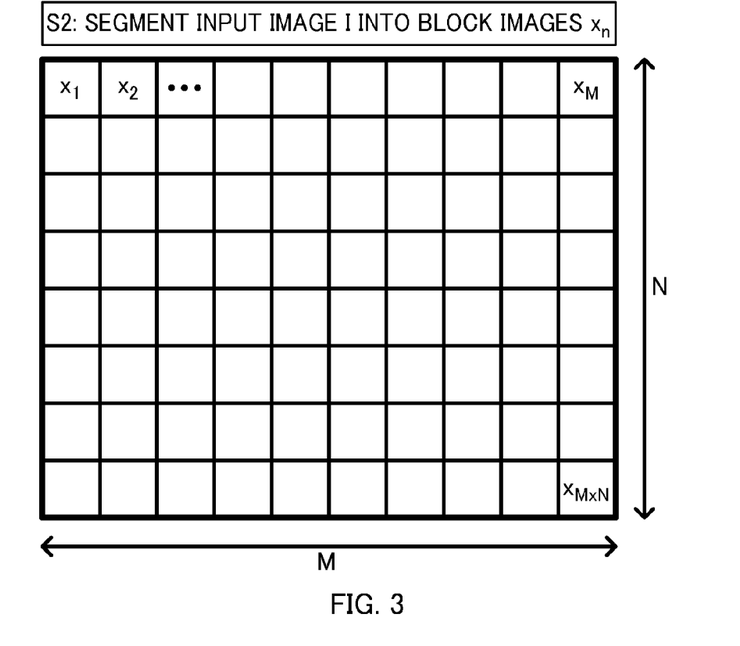
FIG. 3 is an explanatory diagram of an example of a process of segmenting an input image I into block images in a first feature extraction unit 11.

When the input image I to be classified is inputted, to start a processing performed by the program (S1), the input image I is segmented into block images each having a predetermined size (e.g., 32 pixels×32 pixels), as depicted in FIG. 3 (S2). In FIG. 3, as an example, the input image I is segmented into M×N block images $x_n$ ($1 \leq n \leq M \times N$). The feature value $v1[x_n]$ of each block image $x_n$ is then extracted (S3). Thus, processes of S2 and S3 realize the function equivalent to that of the first feature extraction unit 11.

Figure 4:
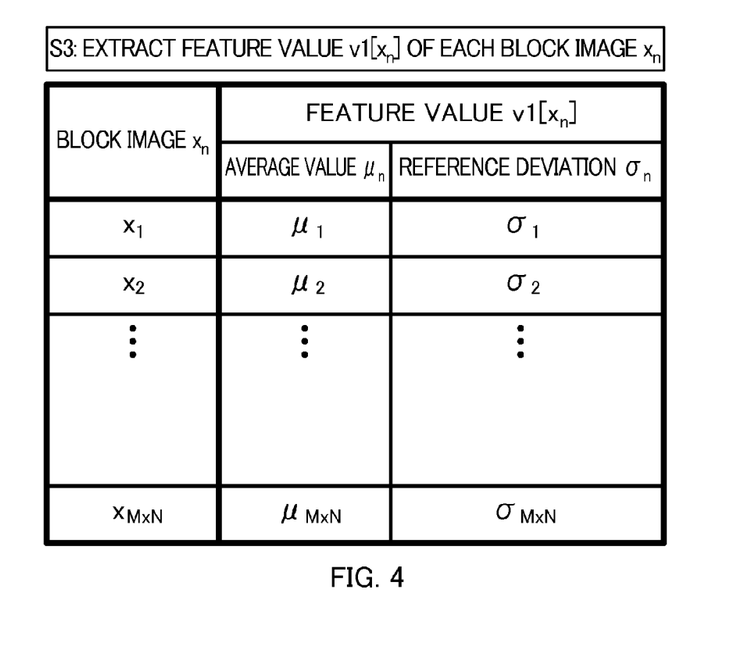
FIG. 4 is an explanatory diagram of an example of a process of extracting a feature value of each of the block images, which is performed by a first feature extraction unit 11.

Here, for example, an average value, standard deviation, of the luminance values of the pixels can be used as the feature value $v1[x_n]$. A vector using a plurality of scalar quantities, such as an average value, standard deviation, of the luminance values of the pixels, can also be used as the feature value $v1[x_n]$. Further, the feature value $v1[x_n]$ may be extracted by using the luminance values of the pixels having been subjected to a filtering process such as edge extraction, instead of directly using the luminance values of pixels. In an embodiment of the present invention, it is assumed as an example that a two-dimensional vector whose elements are an average value $\mu_n$ and a standard deviation $\sigma_n$ of the luminance values of the pixels included in the block image $x_n$ is the feature value $v1[x_n]$, as depicted in FIG. 4.

Subsequently, based on the feature value $v1[x_n]$, each block image $x_n$ is assigned to any one of areas $c_i$ ($0 \leq i \leq K-1$, where K denotes an integer equal to or greater than two), thereby segmenting the input image I into K areas (S4). Thus, a process of S4 realizes the function equivalent to that of the area segmentation unit 12.

In this area segmenting process, for example, each block image $x_n$ is sequentially assigned to a cluster that is closest among the previously prepared K clusters (areas) based on the feature value $v1[x_n]$, thereby assigning block images so that block images similar to one another belong to the same cluster. Assignment of block images to a cluster (clustering) is performed, for example, based on cluster attributes that are acquired from the result of such clustering that learning block image group IL obtained by segmenting each image of learning image group previously prepared separately from the input image I is clustered into K clusters.

Figure 5:
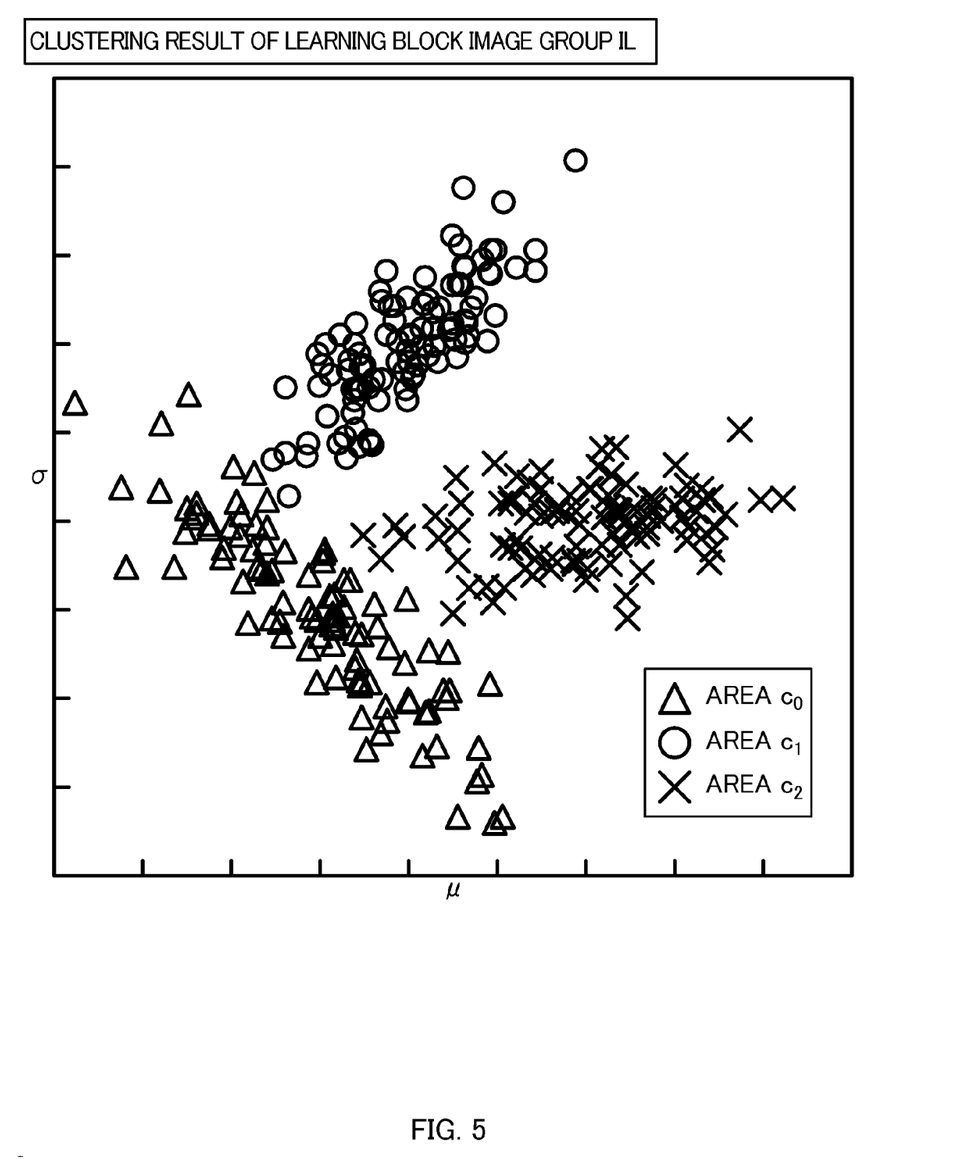
FIG. 5 depicts a diagram illustrating an example of a clustering result of a learning block image group stored in a storage unit 13.

As clustering methods, K-means (C-means), Fuzzy C-means, Gaussian mixture model (GMM), can be employed, for example. These clustering methods are required to be specifically provided with the number of clusters K, however, a method of performing clustering while estimating the optimum number of clusters may be employed. In an embodiment of the present invention, a Gaussian mixture model is used as an example. The clustering result of the learning block image group IL is depicted in FIG. 5. In FIG. 5, the number of clusters K is equal to 3, and the learning block image group IL is assigned to any one of the areas $c_0$, $c_1$, and $c_2$.

In the Gaussian mixture model, a probability density function p(x) obeyed by each data element x (each block image $x_n$) constituting a data aggregate is expressed as follows.

$$p(x|\Theta) = \sum_{k=0}^{K-1} \pi_k N(x|m_k, C_k) \quad [\text{Eq. 1}]$$

In the equation 1, $N(x|m_k, C_k)$ is a D-dimensional normal distribution representing a distribution of a cluster $c_k$, which is expressed by $$N(x|m_k, C_k) = \frac{1}{\sqrt{(2\pi)^D |C_k|}} \exp\left\{-\frac{1}{2}(x-m_k)^T C_k^{-1}(x-m_k)\right\} \quad [\text{Eq. 2}]$$

where mk denoting an average vector and $C_k$ denoting a variance-covariance matrix are parameters. In the equation 1, $\pi_k$ denotes the weight of the cluster $c_k$ and satisfies a condition $$\sum_{k=0}^{K-1} \pi_k = 1 \qquad [\text{Eq. 3}]$$

and $\Theta$ denotes the cluster attributes $\{\pi_k, m_k, C_k\}$ ($0 \leq k \leq K-1$) of all the clusters $c_0, c_1, \ldots, c_{k-1}$. The model parameters $\{\pi_k, m_k, C_k\}$ equivalent to the cluster attributes of the cluster $c_k$ are estimated from the data aggregate (learning block image group IL), using the EM algorithm, thereby being able to acquire the probability of belonging of each block image $x_n$ to each of the clusters, with respect to the input image I. Here, the probability of belonging of the data element x (block image $x_n$) to the cluster $c_k$ is calculated by the following equation based on the Bayes' theorem.

$$p(c_k \mid x) = \frac{p(x \mid c_k) p(c_k)}{p(x \mid \Theta)} = \frac{\pi_k N(x \mid m_k, C_k)}{\sum_{k'=0}^{K-1} \pi_{k'} N(x \mid m_{k'}, C_{k'})} \qquad [\text{Eq. 4}]$$

Further, by assigning each block image $x_n$ to such a cluster that the probability of the belonging is the maximum, the area segmentation result of the input image I is acquired. The cluster attributes (model parameters) $\{\pi_k, m_k, C_k\}$ acquired from the clustering result of the learning block image group IL are stored in the storage unit 13 and are read as appropriate.

Figure 6:
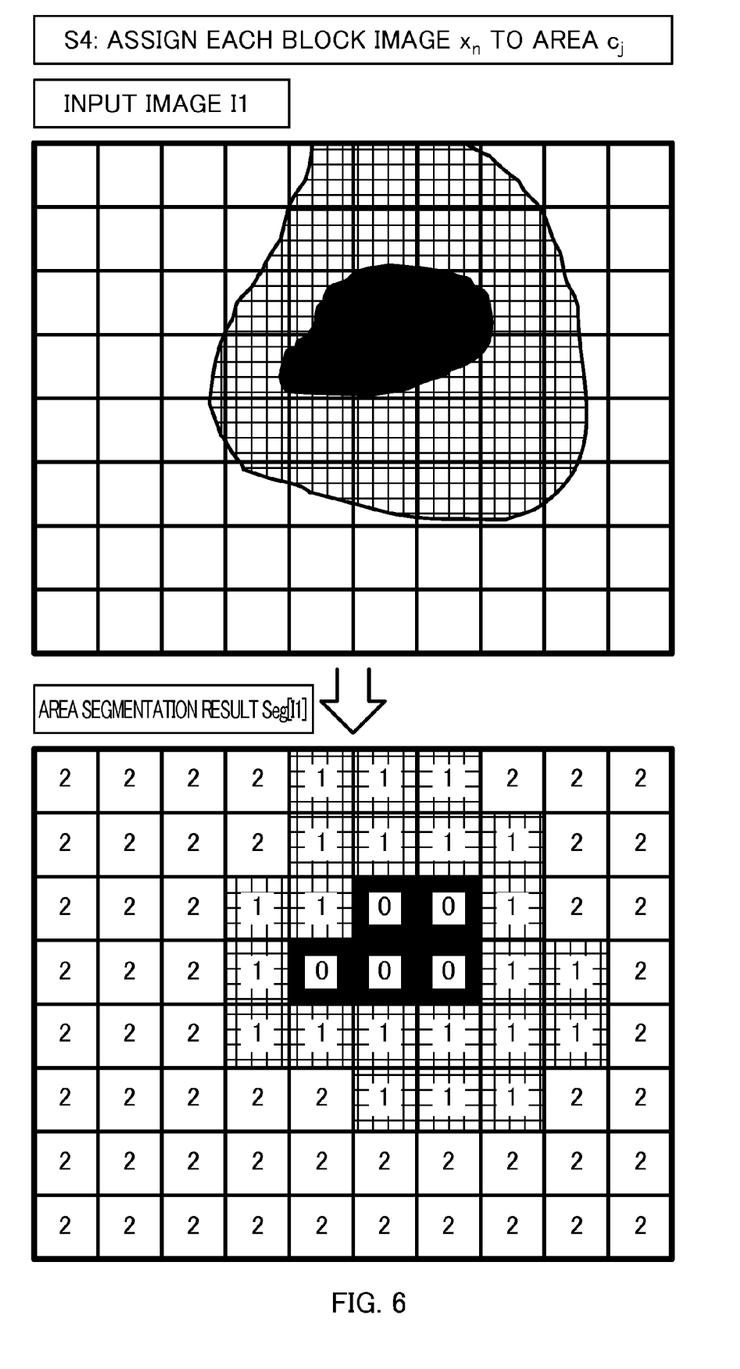
FIG. 6 is an explanatory diagram of an example of a process of assigning each of the block images of an input image I1 to an area, which is performed by an area segmentation unit 12.
Figure 7:
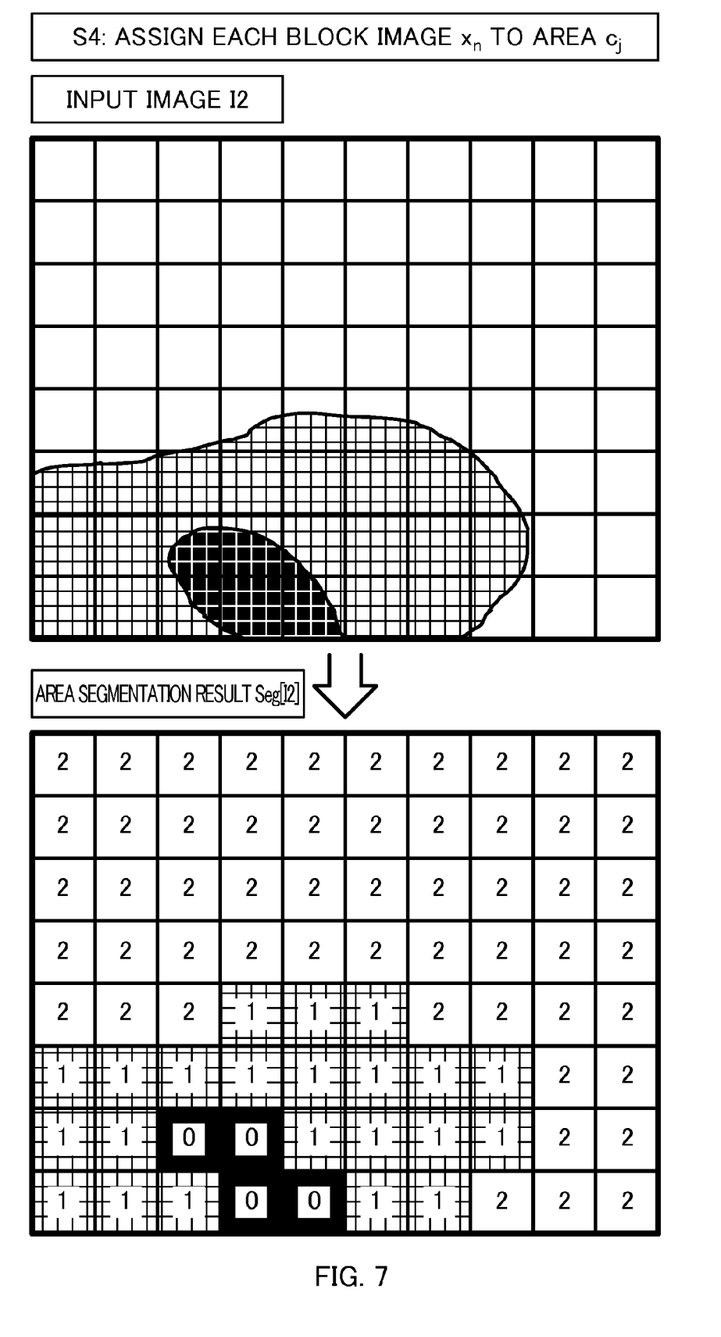
FIG. 7 is an explanatory diagram of an example of a process of assigning each of the block images of an input image I2 to an area, which is performed by an area segmentation unit 12.

Here, FIGS. 6 and 7 each depict an example of the result obtained by performing area segmentation of each of the input images I1 and I2 that should belong to the same category, based on the cluster attributes with the number of clusters K set at 3. By performing area segmentation based on the cluster attributes $\{\pi_k, m_k, C_k\}$ acquired from the clustering result of the learning block image group IL, it becomes possible to assign portions different in luminance from each other to the same area $c_0$, as depicted in FIGS. 6 and 7, without establishing the area-to-area correspondences between images, as in the image classification techniques in Japanese Laid-Open Patent Publication Nos. 8-180176 and 2006-163841.

Subsequently, a feature vector v2[I] is calculated based on the area segmentation result Seg[I] of the input image I (S5). Thus, a process of step S5 realizes the function equivalent to that of the second feature extraction unit 14.

Figure 8:
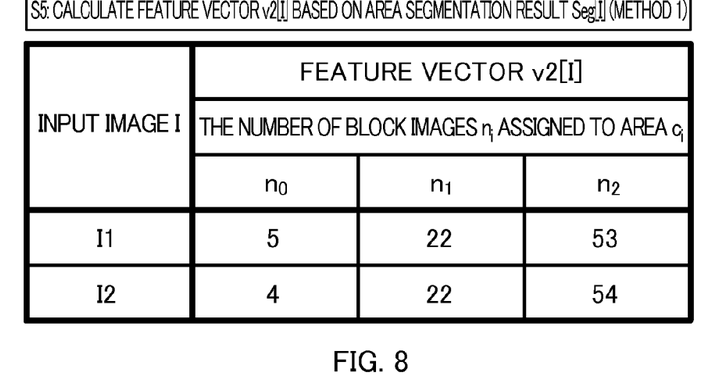
FIG. 8 is an explanatory diagram of an example of a process of calculating a feature vector based on an area segmentation result, which is performed a second feature extraction unit 14.

As the feature vector v2[I], for example, a K-dimensional vector can be used, the K-dimensional vector having elements each representing the number of block images $x_n$ in each area to which the block images $x_n$ are assigned, that is, the number of block images $n_i$ assigned to each area $c_i$. The numbers of the block images $n_i$ ($0 \leq i \leq 2$) in each of the input images I1 and I2 are depicted in FIG. 8, and feature vectors can be expressed as follows.

$$V2[I1]=(5,22,53)$$

$$V2[I2]=(4,22,54)$$

Finally, it is classified which category the input image I belongs to out of pre-defined two or more categories based on the feature vector v2[I], and a classification category Cat[I] is outputted (S6), and then the process is ended (S7). Thus, a process of S6 realizes the function equivalent to that of the classification unit 15.

As a classification algorithm, for example, a known supervised classification algorithm for numerical vectors, such as linear discriminant analysis, neural network, and support vector machine, can be used. For example, if the feature vector v2[I] of the input image I is inputted to a classification apparatus that has undergone a pre-learning process using a previously prepared learning image group with supervised labels attached thereto, thereby being able to output the classification category Cat[I]. In another case, for example, the feature vector of each of the learning images is stored in advance in the storage unit 13 or in a different storage unit, and a category to which a learning image most similar to the feature vector v2[I] of the input image I belongs may be outputted as the classification category Cat[I].

Figure 9:
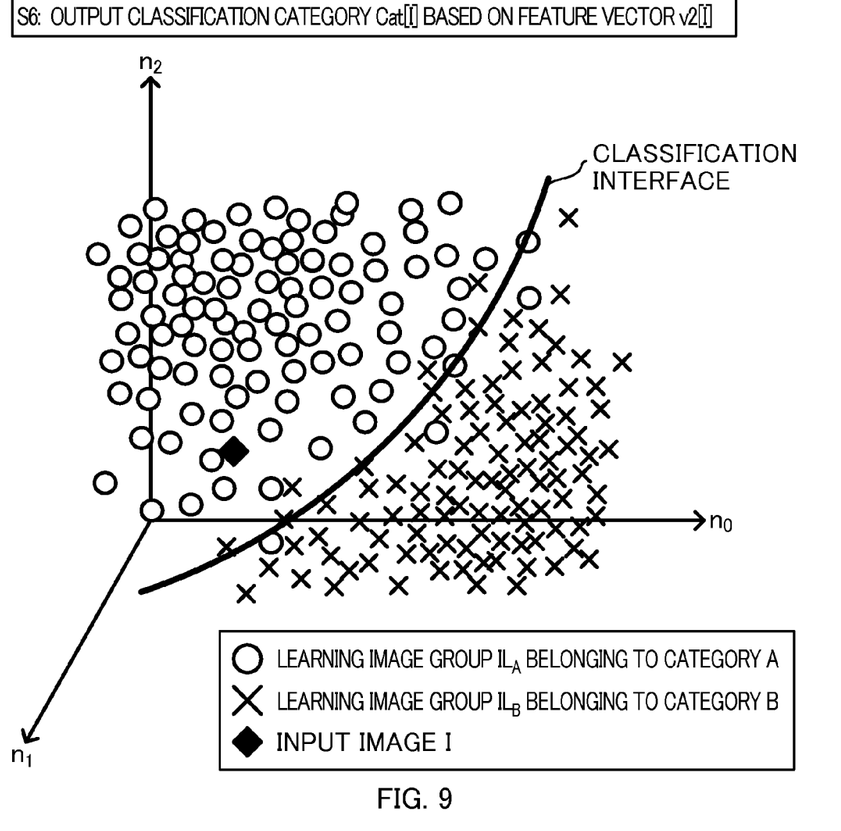
FIG. 9 is an explanatory diagram illustrating an example of a process of outputting a classification category based on a feature vector, which is performed by a classification unit 15.

FIG. 9 depicts, as an example, a process of outputting the classification category Cat[I] based on the feature vector v2[I]= $(n_o, n_1, n_2)$, using a learning image group $IL_A$ belonging to a category A and a learning image group $IL_B$ belonging to a category B. The input image I is classified as an image belonging to either of the categories depending on which side the input image I is present with respect to a classification interface determined by the learning image groups. In FIG. 9, classification category Cat[I]=A is outputted.

When the Euclid distance between the feature vector v2[I1] and the feature vector v2[I2] is expressed as $d_E$(I1, I2), the Euclid distance in the feature space in FIG. 9 is expressed as follows.

$$d_E(I1,I2)=1.414$$

This Euclid distance $d_E$(I1, I2) is a small value, which means that the input image I1 and the input image I2 are close (similar) to each other.

As such, the image classification apparatus 1 acquires the K-dimensional feature vector v2[I] having elements representing the numbers of block images $n_i$ assigned to areas $c_i$, respectively, based on the area segmentation result Seg[I] of the input image I, and classifies a category to which the input image I belongs based on the feature vector v2[I].

=Another Example of Feature Vector=

Figure 10:
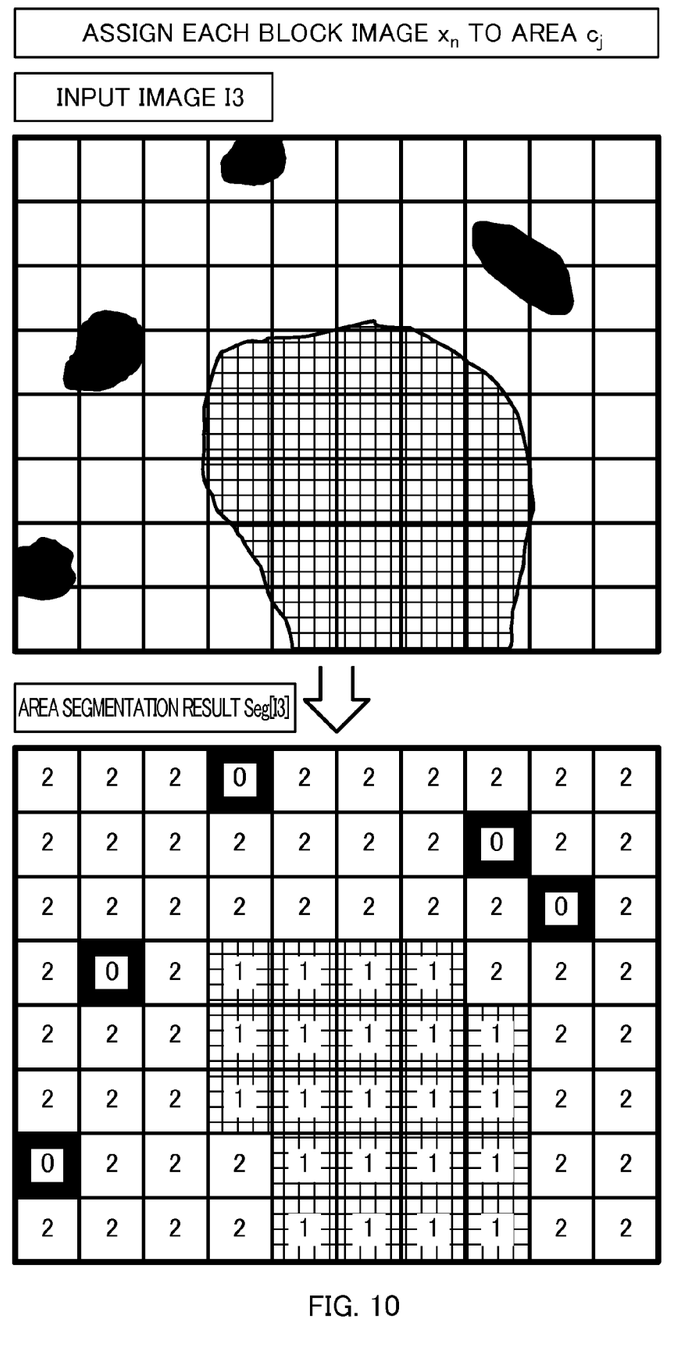
FIG. 10 is an explanatory diagram illustrating an example of a process of assigning each of the block images of an input image I3 to an area, which is performed by an area segmentation unit 12.

In an embodiment of the present invention described above, the K-dimensional vector having elements representing the numbers of block images $n_i$ assigned to areas $c_i$, respectively is used as the feature vector v2[I] (hereinafter, referred to as a "method 1") but it is not limited thereto. In the method 1, for example, the value of each $n_i$ of an input image I3 depicted in FIG. 10 is the same as that of the input image I1, which should lead the input images I1 and I3 to belong to the same category. However, for example, in such a case where the input images I1 and I3 are images of cell masses cultured in a cell culture apparatus, the input images I1 and I2 should be classified as images belonging to the same category while the input image I3 should be classified as an image belonging to a category different from the category to which the input images I1 and I2 belong.

Then, as an element of the feature vector v2[I], the following element can be used in place of $n_i$ or added thereto, which is the number of adjacent spots each including two of the block images adjacent to each other, for each combination of the areas to which the two block images are assigned, that is, the number of adjacent spots $n_{ij}$ each including the block image assigned to the area $c_i$ and the block image assigned to an area $c_j$ (hereinafter, referred to as a "method 2"), in other words, the number of adjacent spots in each of the areas, the adjacent spots is where two of the block images are adjacent to each other, the each of the areas corresponding to an area to which the each of the two of the block images are assigned.

Figure 11:
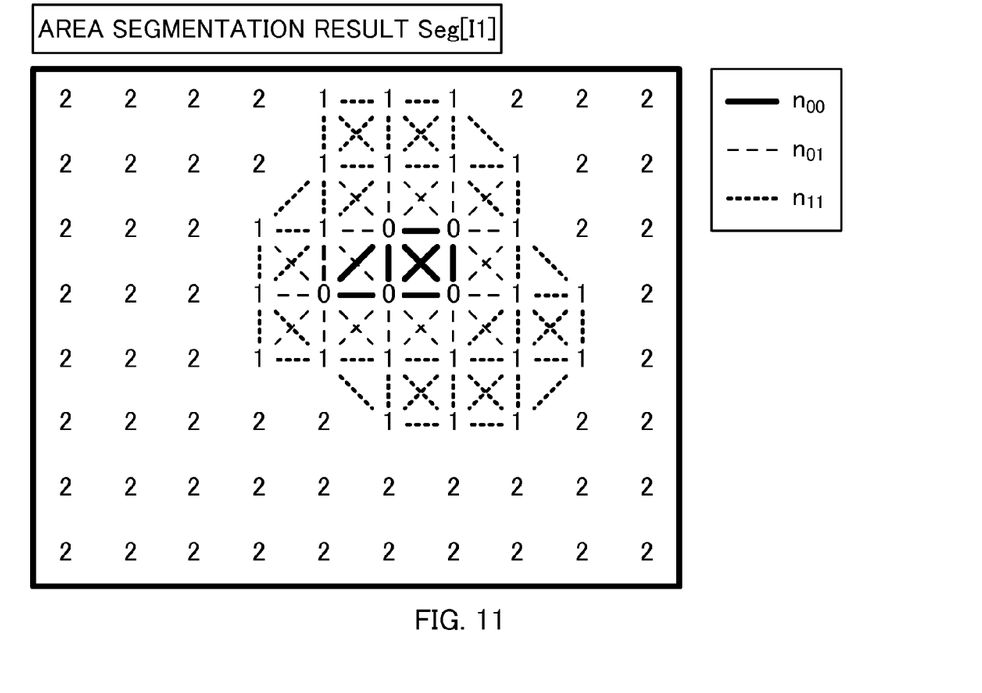
FIG. 11 is an explanatory diagram illustrating a method of calculating the number of adjacent spots in an area segmentation result of an input image I1.

Here, as an example, the numbers of adjacent spots $n_{00}$, $n_{01}$, and $n_{11}$ in the area segmentation result Seg[I1] of the input image I1 are acquired in a manner as depicted in FIG. 11. That is, the number of adjacent spots $n_{00}$ each including the two block images assigned to the area $c_0$ is 8, which is counted as the number of solid lines. The number of adjacent spots $n_{01}$ each including the block image assigned to the area $c_0$ and the block image assigned to the area $c_1$ is 24, which is counted as the number of long broken lines. The number of adjacent spots $n_{11}$ each including the two block images assigned to the area $c_1$ is 47, which is counted as the number of short broken lines.

Figure 12:
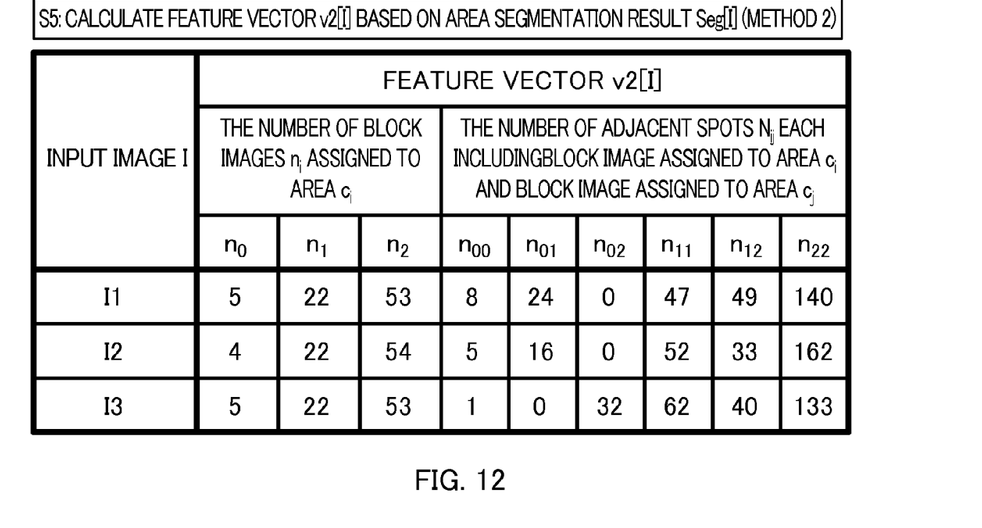
FIG. 12 is a diagram illustrating another example of a feature vector calculated by a second feature extraction unit 14.

The values of $n_{ij}$ ($0 \leq i \leq j \leq 2$) acquired with respect to the input images I1 and I3 as such are depicted in FIG. 12. When the feature vector v2[I] has only $n_i$ as its elements in place of $n_i$, the feature vector v2[I] is [K(K+1)/2]-dimensional vector. When the feature vector v2[I] has both $n_i$ and $n_{ij}$ as its elements, the feature vector v2[I] is [K+K(K+1)/2]-dimensional vector.

When acquiring the Euclid distances between feature vectors having both $n_i$ and $n_{ij}$ as their elements, the results are given as follows.

$$d_E(I1,I2)=28.98$$

$$d_E(I1,I3)=44.77$$

$$d_E(I2,I3)=47.83$$

These results by the method 2 indicates that the input images I1 and I2 are close (dissimilar) to each other and that the input image I3 is distant (different) from the input images I1 and I2. Thus, based on the feature vector v2[I] having $n_{ij}$ as its elements, the input images I1 and I2 are classified as images belonging to the same category, while the input image I3 is classified as an image belonging to a category different from the category to which the input images I1 and I2 belong.

In FIGS. I1 and I2, only $n_{ij}$ ($0 \leq i \leq j \leq 2$) is used without distinguishing between $n_{ij}$ and $n_{ji}$, but both $n_{ij}$ and $n_{ji}$ may be used. This case results in $n_{ii}=n_{ji}$. The number of adjacent spots $n_{ij}$ may be subdivided in each of the directions of adjacency so that the number of adjacent spots counted in the vertical (up-and-down) direction, in the lateral (left-and-right) direction, and in the diagonal direction may be used as the elements of feature vector v2[I].

=Still Another Example of Feature Vector=

Further, as an element of the feature vector v2[I], the ratio or probability of the number of block images and the number of adjacent spots may be used, instead of directly using the number of block images and the number of adjacent spots (hereinafter, referred to as a "method 3").

For example, in place of the number of block images $n_i$ assigned to the area $c_i$, the ratio of block images assigned to each area $c_i$ to M×N block images $x_n$ in the input image I can be used as the element of the feature vector v2[I]. This ratio can be acquired as a probability $p(c_i)$ that a block image will be assigned to the area $c_i$. The probability $p(c_i)$ is expressed as follows, using $n_i$.

$$P(c_i)=n_i/(M \times N)$$

For example, in place of the number of adjacent spots $n_{ij}$ each including the block image assigned to the area $c_i$ and the block image assigned to the area $c_j$, the ratio of block images assigned to the area $c_j$ to block images adjacent to block images assigned to the area $c_i$ can be used as the element of the feature vector v2[I], in other words, the probability can be used as the element thereof that one of the block images, which is assigned to one of the areas, is adjacent to another one of the block images, the another one of the block images is assigned to the same area as to which the one of the block images is assigned or is assigned to a different area from the area to which one of the block images is assigned. This ratio can be calculated as a (conditional) probability $p(c_j|c_i)$ that block images assigned to the area $c_i$ will be adjacent to block images assigned to the area $c_j$. The probability $p(c_j|c_i)$ is expressed as follows, using $n_{ij}$ ($0 \leq i, j \leq 2$).

$$p(c_j|c_i)=2n_{ij}/N_i (i=j)$$

$$p(c_j|c_i)=n_{ij}/N_i (i \neq j)$$

where $N_i$ denotes the total number of block images adjacent to block images assigned to the area $c_i$, and is expressed as follows.

$$N_i = 2n_{ii} + \sum_{i \neq j} n_{ij}$$

Figure 13:
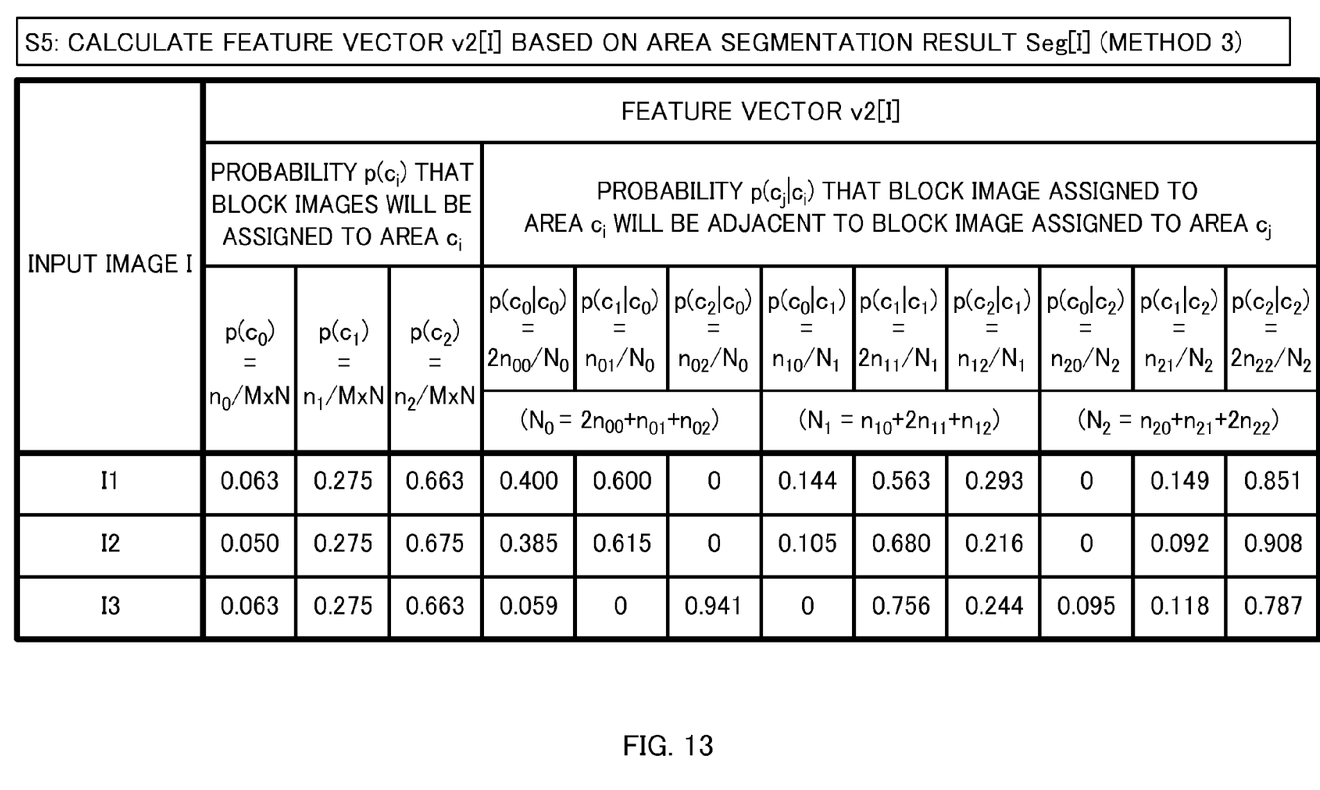
FIG. 13 is a diagram illustrating still another example of a feature vector calculated by a second feature extraction unit 14.

The probability $P(c_i)$ and the probability $p(c_j|c_i)$ in the input images I1 and I3 acquired as such are depicted in FIG. 13. When the feature vector v2[I] has only the probability $P(c_i)$ as its elements, the feature vector v2[I] is K-dimensional vector. When the feature vector v2[I] has only the probability $p(c_j|c_i)$, the feature vector v2[I] is K2-dimensional vector. When the feature vector v2[I] has both probabilities $P(c_i)$ and $p(c_j|c_i)$ as its elements, the feature vector v2[I] is (K+K2)-dimensional vector.

When acquiring the Euclid distances between feature vectors having both probabilities $P(c_i)$ and $p(c_j|c_i)$ as their elements, the results are given as follows.

$$d_E(I1,I2)=0.169$$

$$d_E(I1,I3)=1.198$$

$$d_E(I2,I3)=1.188$$

Thus, the results by the method 3 indicates that the input images I1 and I2 are close (similar) to each other while the input image I3 is distant (dissimilar) from the input images I1 and I2, more clearly than those by the method 2. Similarly to the case of the probability $p(c_j|c_i)$ may be subdivided in each of the directions of adjacency so that the probability $P(c_j|c_i)$ acquired in the vertical (up-and-down) direction, in the lateral (left-and-right) direction, and in the diagonal direction may be used as the elements of feature vector v2[I].

As described above, the image classification apparatus 1 acquires the feature vector v2[I] whose elements represent the numbers of block images $n_i$ respectively assigned to areas $c_i$, based on the area segmentation result Seg[I] of the input image I, thereby being able to classify a category to which the input image I belongs based on the feature vector v2[I], even when the shape, size, position, of a target to be classified vary and/or are unfixed, and/or when extraction of the target to be classified is difficult. The probability $p(c_i)$ that block images will be assigned to the area $c_i$ may be used in place of $n_i$, as the element of the feature vector v2[I].

The number of adjacent spots $n_{ij}$ each including the block image assigned to an area $c_i$ and the block image assigned to an area $c_j$ is used, as the element of the feature vector v2[I], in place of $n_1$ or in addition thereto, thereby being able to properly classify a category with respect to the input image I of a natural phenomenon, such as cell masses or clouds. The (conditional) probability $P(c_j|c_i)$ that block images assigned to the area $c_i$ will be adjacent to block images assigned to the area $c_j$ is used, as the element of the feature vector v2[I], in place of the probability p($c_i$) or in addition thereto, thereby being able to further properly classify a category with respect to the input image I of a natural phenomenon, such as cell masses or clouds.

The number and the probability acquired by subdividing the number of adjacent spots $n_{ij}$ and the probability ($c_j|c_i$) in each of the directions of adjacency are used as elements of the feature vector v2[I], thereby Being able to improve the precision in classifying a category to which the input image I belongs.

Further, the cluster attributes {$\pi_k$, $m_k$, $C_k$} acquired from the clustering result of the previously prepared learning block image group IL are stored in the storage unit 13, thereby being able to perform area segmentation of the input image I based on the cluster attributes {$\pi_k$, $m_k$, $C_k$} without establishing the area-to-area correspondences between images.

Further, a category, to which the input image I of cell masses cultured by the cell culture apparatus belongs, is classified based on the feature vector v2[I], thereby being able to classify, with high precision, cell masses whose shapes, sizes, directions, positions, vary and/or are unfixed, and/or which is difficult to be extracted as a target to be classified.

A program for causing a computer to realize the functions equivalent to those of the first feature extraction unit 11, the area segmentation unit 12, the second feature extraction unit 14, and the classification unit 15 in the image classification apparatus 1 is executed to acquire the feature vector v2[I] whose elements include $n_i$ or p($c_j$), based on the area segmentation result Seg[I] of the input image I, and classify a category to which the input image I belongs, based on the feature vector v2[I], thereby being able to classify, with high precision, a target to be classified whose shape, size, direction, position, vary and/or are unfixed, and/or which is difficult to be extracted.

A category to which the input image I belongs is classified based on the feature vector v2[I] whose elements include $n_{ij}$ or the probability p($c_j|c_i$), thereby being able to properly classify a category with respect to the input image I of a natural phenomenon, such as an cell masses and clouds.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An image classification apparatus comprising;
   a first feature extraction unit structured to segment an input image into a plurality of block images each having a predetermined size, and acquire a feature value of each of the plurality of block images;
   an area segmentation unit structured to segment the input image into K areas by assigning each of the plurality of block images to any one of the K areas based on the feature value, K denoting an integer equal to or greater than two;
   a second feature extraction unit structured to acquire, based on an area segmentation result of the area segmentation unit, a feature vector whose elements including,
      the number of adjacent spots in each of areas, the adjacent spots is where two of the block images are adjacent to each other, the each of areas corresponding to an area to which the each of the two of the block images are assigned; or
      a probability that one of the block images, which is assigned to one of the K areas, is adjacent to another one of the block images, the another one of the block images is assigned to the same area as to which the one of the block images is assigned or is assigned to a different area from the area to which one of the block images is assigned; and
   a classification unit structured to classify which of a plurality of categories the input image belongs to, based on the feature vector.

2. The image classification apparatus of claim 1, wherein the second feature extraction unit structured to acquire, based on an area segmentation result from the area segmentation unit, the feature vector whose elements including,
   the number of adjacent spots are counted in the vertical direction, in the lateral direction, and in the diagonal direction, or
   the probability is acquired in the vertical direction, in the lateral direction, and in the diagonal direction.

3. The image classification apparatus of claim 2, further comprising:
   a storage unit structured to store therein an area segmentation result obtained by segmenting each of a plurality of learning images into the K areas, based on the feature value of each of the plurality of block images obtained by segmenting each of the plurality of learning images, wherein
   the area segmentation unit is structured to segment the input image into the K areas based on the area segmentation result stored in the storage unit.

4. The image classification apparatus of claim 3, wherein the input image includes an image of a cell mass cultured in a cell culture device.

5. The image classification apparatus of claim 2, wherein the input image includes an image of a cell mass cultured in a cell culture device.

6. The image classification apparatus of claim 1, further comprising:
   a storage unit structured to store therein an area segmentation result obtained by segmenting each of a plurality of learning images into the K areas, based on the feature value of each of the plurality of block images obtained by segmenting each of the plurality of learning images, wherein
   the area segmentation unit is structured to segment the input image into the K areas based on the area segmentation result stored in the storage unit.

7. The image classification apparatus of claim 6, wherein the input image includes an image of a cell mass cultured in a cell culture device.

8. The image classification apparatus of claim 1, wherein the input image includes an image of a cell mass cultured in a cell culture device.

9. A non-transitory recording medium having a program recorded therein, the program causing a computer whereto an input image to be classified is inputted, to execute:
   segmenting the input image into a plurality of block images each having a predetermined size;
   acquiring a feature value of each of the plurality of block images;
   segmenting the input image into the K areas by assigning each of the plurality of block images to any one of K areas based on the feature value, K denoting an integer equal to or greater than two;
   acquiring, based on an area segmentation result obtained by segmenting the input image into the K areas, a feature vector whose elements include,
      the number of adjacent spots in each of areas, the adjacent spots is where two of the block images are adjacent to each other, the each of areas corresponding to an area to which the each of the two of the block images are assigned, or a probability that one of the block images, which is assigned to one of the K areas, is adjacent to another one of the block images, the another one of the block images is assigned to the same area as to which the one of the block images is assigned or is assigned to a different area from the area to which one of the block images is assigned; and classifying which of a plurality of categories the input image belongs to based on the feature vector.

* * * * *